C. S. WERTSNER.
SCREEN MOUNT FOR PROJECTION MACHINE WORK AND SIMILAR PURPOSES.
APPLICATION FILED JAN. 24, 1912.
1,057,470.
Patented Apr. 1, 1913.
2 SHEETS—SHEET 1.
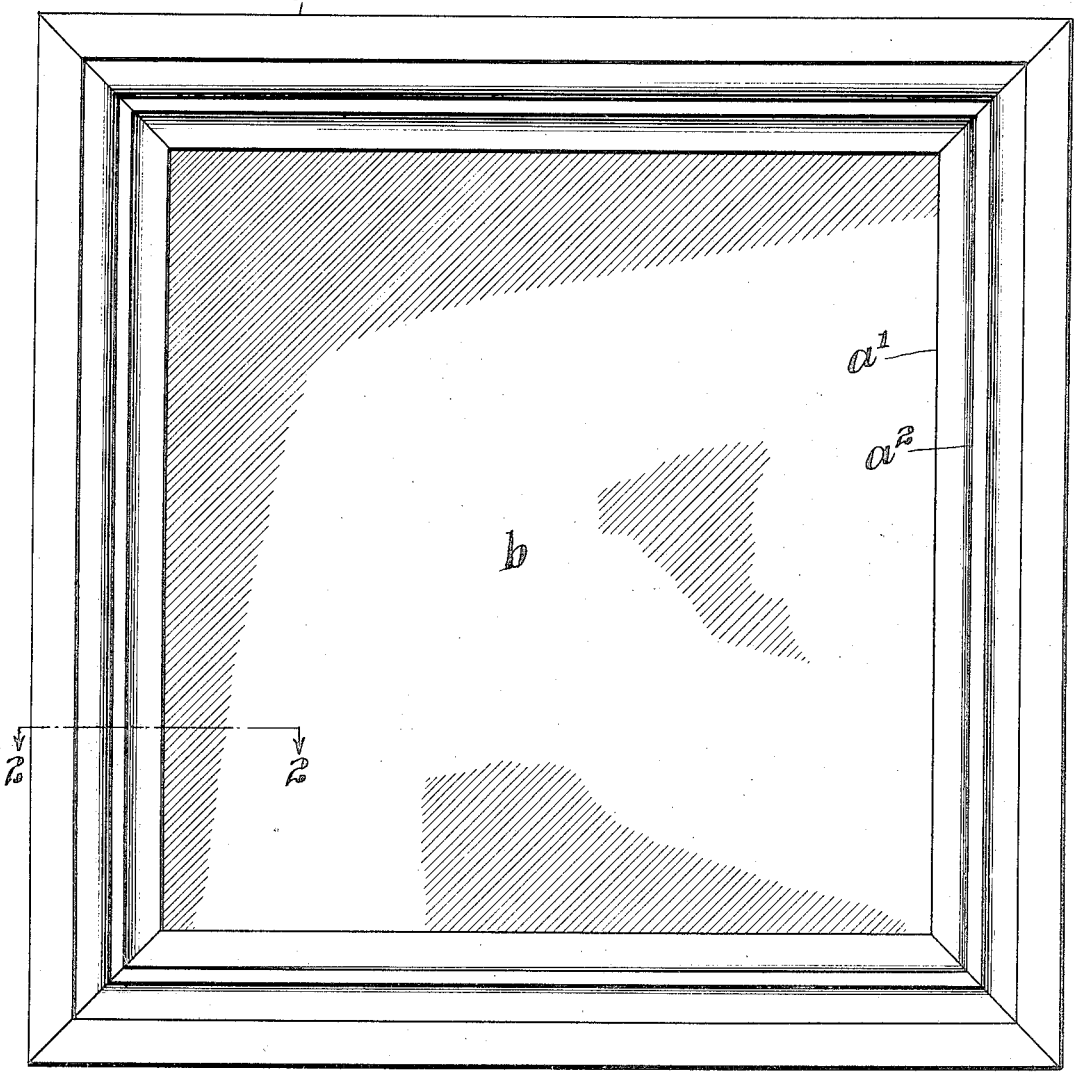
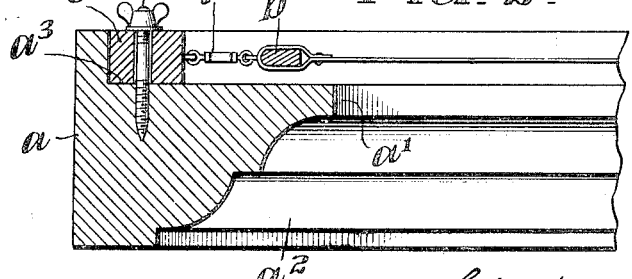
WITNESSES
Thomas M. Smith
Helen F. Miller
INVENTOR
Clayton S. Wertsner,
BY
J. Walter Douglass
ATTORNEY

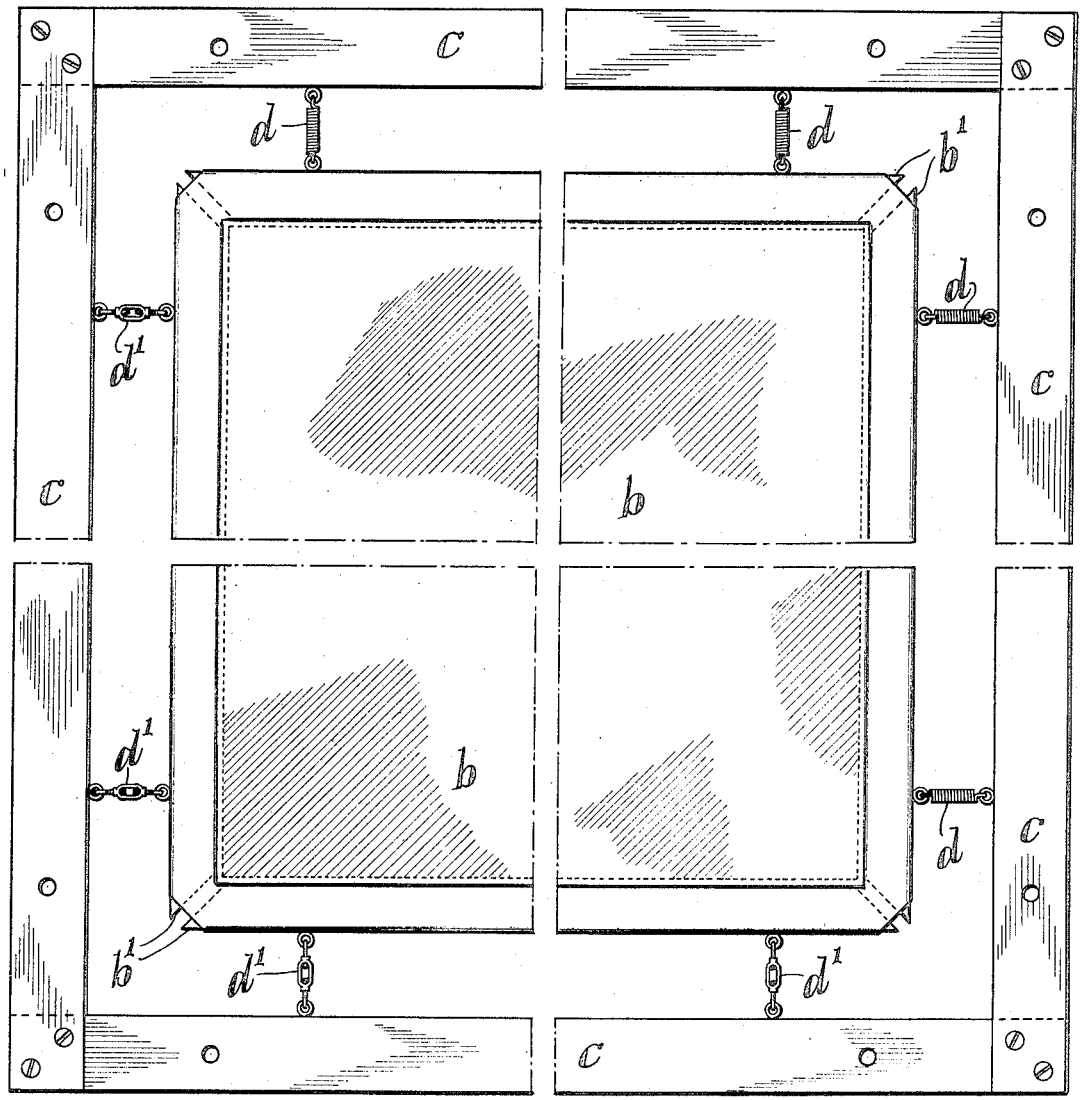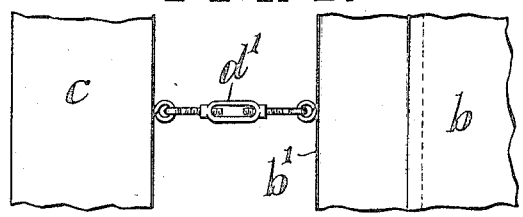

UNITED STATES PATENT OFFICE.

CLAYTON S. WERTSNER, OF PHILADELPHIA, PENNSYLVANIA, ASSIGNOR TO WILLIAMS, BROWN AND EARLE, INC., OF PHILADELPHIA, PENNSYLVANIA, A CORPORATION OF PENNSYLVANIA.

SCREEN-MOUNT FOR PROJECTION-MACHINE WORK AND SIMILAR PURPOSES.

1,057,470. Specification of Letters Patent. Patented Apr. 1, 1913.

Application filed January 24, 1912. Serial No. 673,149.

*To all whom it may concern:*

Be it known that I, CLAYTON S. WERTSNER, a citizen of the United States, residing at the city of Philadelphia, in the county of Philadelphia and State of Pennsylvania, have invented certain new and useful Improvements in Screen-Mounts for Projection-Machine Work and Similar Purposes, of which the following is a specification.
My invention has relation to a screen for throwing images of objects thereon, in lantern slide, stereopticon, moving picture or other similar work; and in such connection it relates to the constructive arrangement of the screen held within a framing by means of adjusting devices connected with the screen and framing, whereby the screen is held taut throughout under the tension of said devices so as to permit a symmetrical, smooth or plane surfaced screen to be provided, for the exhibiting of images of objects thereon.

The nature and scope of my present invention will be more fully understood from the following description taken in connection with the accompanying drawings forming part hereof, in which—

Figure 1, is a perspective front elevation of what represents a stage-setting, the wall outlining the opening of which is provided with preferably an ornamental capping and the screen exposed in the opening compassing the same; the said view serving to illustrate an embodiment of main features of my said invention. Fig. 2, is an enlarged sectional view on the line 2, 2, of Fig. 1, showing the screen and adjustable connections for the same with the framing within which the screen is supported and also showing one way of attaching the framing to the rear wall of the stage-setting. Fig. 3, is a front elevational view of a screen and a framing in connection with each other by means of a modified form of spring suspension devices and also showing swivel-nut adjusting devices in connection with the screen and framing, to compensate for the slack of the screen supported in the said framing in order to maintain the said screen taut throughout; and Fig. 4, is a fragmentary elevational view, enlarged, of the swivel-nut adjusting devices for the screen suspended in the framing therefor.

Referring to the drawings $a$, represents a stage-setting having an opening $a^1$, the front wall surrounding said opening provided with an ornamental capping $a^2$.

$b$, is a screen of canvas or other suitable material either plain or coated. The rear terminal portions of the screen are reinforced preferably with strips of wood, metal or cord $b^1$, and each arranged and secured to the screen so as to be independent of the other to provide a slanting open space between pairs of the series of the screen, as clearly shown in Fig. 3, in order that under the adjusting tension under which the screen is maintained in a framing to be hereinafter fully explained, the take-up of slack or bulging of the screen in parts or portions thereof, may be accomplished readily as well as effectively in a uniform manner throughout, with the open slanting corner spaces assisting to such end through adjustments of the said screen within its framing and without buckling or bulging of the screen about the respective corners thereof.

$c$, is a framing, as shown, of larger area than the screen $b$. In the said framing is suspended by means of adjustable connections $d$, the screen $b$. Certain of the said connections are provided with swivel-nuts $d^1$, to readily take up slack of the screen mounted in its framing $c$, and without having to disarrange the said framing $c$, in its attachment to the rear wall $a^3$, of the stage-setting $a$. The attachment of the said framing $c$, with the said wall $a^3$, is preferably by means of fastening devices $e$, as clearly shown in Fig. 2. When the screen $b$, is mounted in the opening of the stage-setting $a$, the tensioning means $d$, and take-up means $d^1$, in connection with the screen $b$, and the framing $c$, are concealed from view, as clearly shown in Fig. 1.

In Fig. 3, on two sides of the screen $b$, and framing $c$, the spring tensioning means $d$, are shown, and on the other two sides, swivel-nut adjusting devices $d^1$, to compensate for slack of the screen $b$, whereby the same can be readily maintained in a taut condition at all times, with but little trouble in so doing.

Hitherto in the use of screens for projection machine work difficulty has been experienced in keeping the screen taut owing to the wind currents of the house bellying, wrinkling or vibrating the same to the annoyance of the exhibitor, and hence to a greater or less degree detracting from the effects desired in the throwing of the image of a distant object onto such screen. Usually the screen has been simply arranged so as to span the stage opening but unless the screen was tightly fastened at all points from the rear of the stage opening unsatisfactory results invariably resulted in the showing of such projected image of the object thereon. According to my invention as above described the said objections are entirely obviated, in that when the screen is once in position locked or latched by its framing $c$, to the rear wall of the stage-setting, in case any portion becomes slack the adjusting devices of the screen in connection with the framing $c$, are so arranged as that this slackness may be readily compensated for by simply turning the swivel nuts $d^1$, without having to disarrange the screen-mount in its fixed relation with the stage-setting wall.

Having thus described the nature and object of my invention, what I claim as new and desire to secure by Letters Patent is:—

The combination, in a screen-mount, of a setting, a screen-sheet connected with a framing, consisting of two sides and two ends respectively rigidly secured together, the screen-sheet proper having reinforce rear edge-strips, each independent of the others to provide corner-spaces to compensate thereby for take up of the screen-sheet as required, spring tension means to support said screen-sheet in operative position within the field of said framing and devices connected with certain other reinforce edge-strips of said screen-sheet and said framing, to compensate for buckling or bulging of said screen-sheet aided by certain of said reinforcing edge-strips, substantially as and for the purpose described.

In witness whereof, I have hereunto set my signature in the presence of the two subscribing witnesses hereto.

CLAYTON S. WERTSNER.

Witnesses:
E. P. MARIEN,
ELSIE MÜLLER.